United States Patent
Wark et al.

(10) Patent No.: US 6,705,412 B1
(45) Date of Patent: Mar. 16, 2004

(54) E-Z AUGER ADAPTOR

(76) Inventors: Edward Lee Wark, 1095 Mckimmy, Beaverton, MI (US) 48612; Robert James Anderson, 1103 Mckimmy, Beaverton, MI (US) 48612

( * ) Notice: Subject to any disclaimer, the term of this patent is extended or adjusted under 35 U.S.C. 154(b) by 0 days.

(21) Appl. No.: 10/249,634

(22) Filed: Apr. 28, 2003

(51) Int. Cl.[7] ................................................. F25C 5/04

(52) U.S. Cl. ......................................... 175/18; 175/121

(58) Field of Search ................................ 175/18, 7, 24, 175/121

(56) References Cited

U.S. PATENT DOCUMENTS

| | | | | | |
|---|---|---|---|---|---|
| 3,032,126 A | * | 5/1962 | Rexine | ........................ | 175/18 |
| 3,198,266 A | * | 8/1965 | Mishler | ........................ | 175/18 |
| 3,705,632 A | * | 12/1972 | Burke | ........................ | 173/27 |
| 4,971,161 A | * | 11/1990 | Godell | ........................ | 175/18 |
| 5,330,014 A | * | 7/1994 | Wagner | ........................ | 175/18 |

* cited by examiner

*Primary Examiner*—Roger Schoeppel

(57) ABSTRACT

The field of invention relates to ice auger that connects a standard battery operated drill to an adapter that connects a standard battery operated drill to an ice auger. Description of the prior art—Ice augers are known in the prior art and have been extensively utilized by fisherman during winter. To the best of my knowledge, there are no other patents comparable to the Easy Auger Adapter.

1 Claim, 2 Drawing Sheets

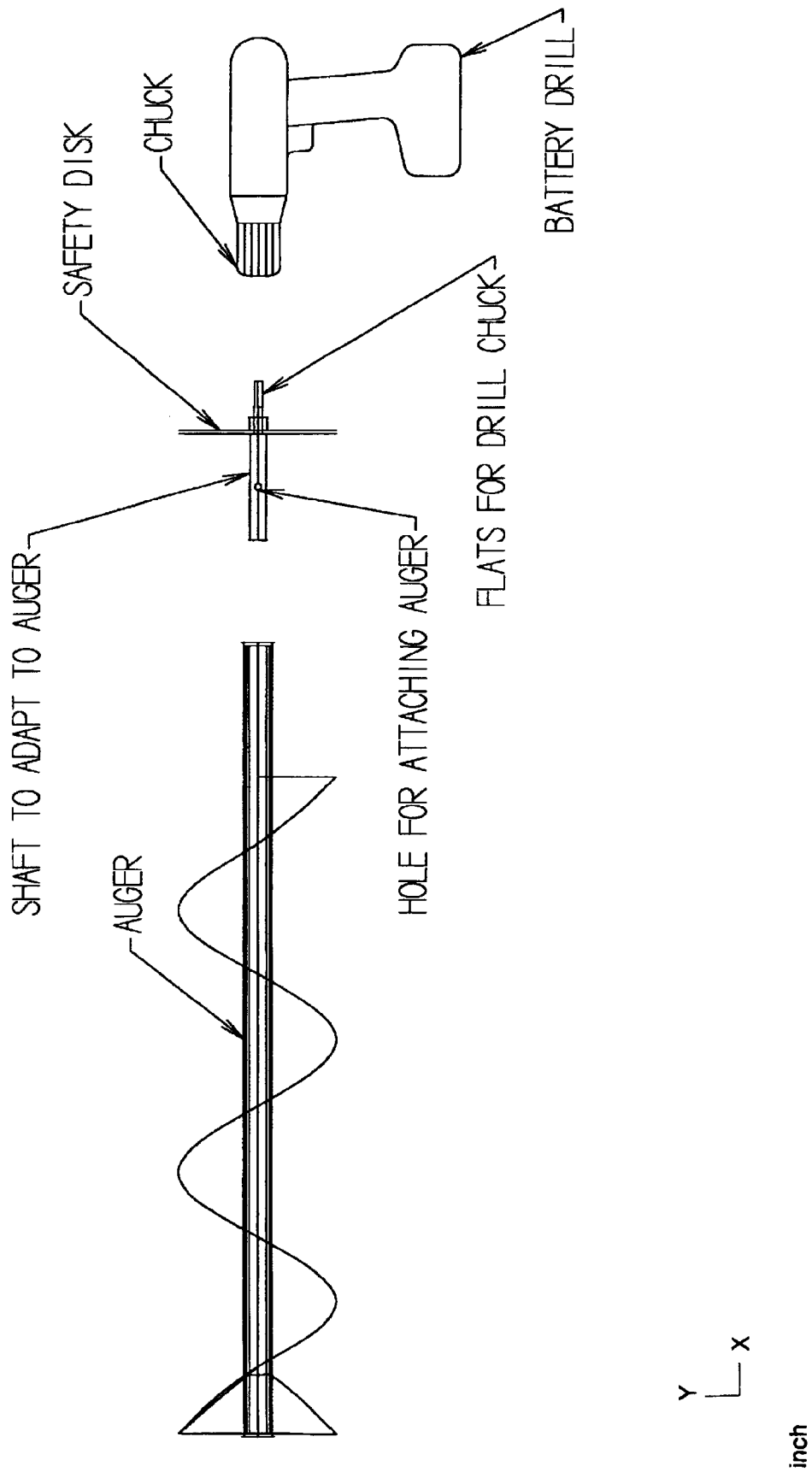

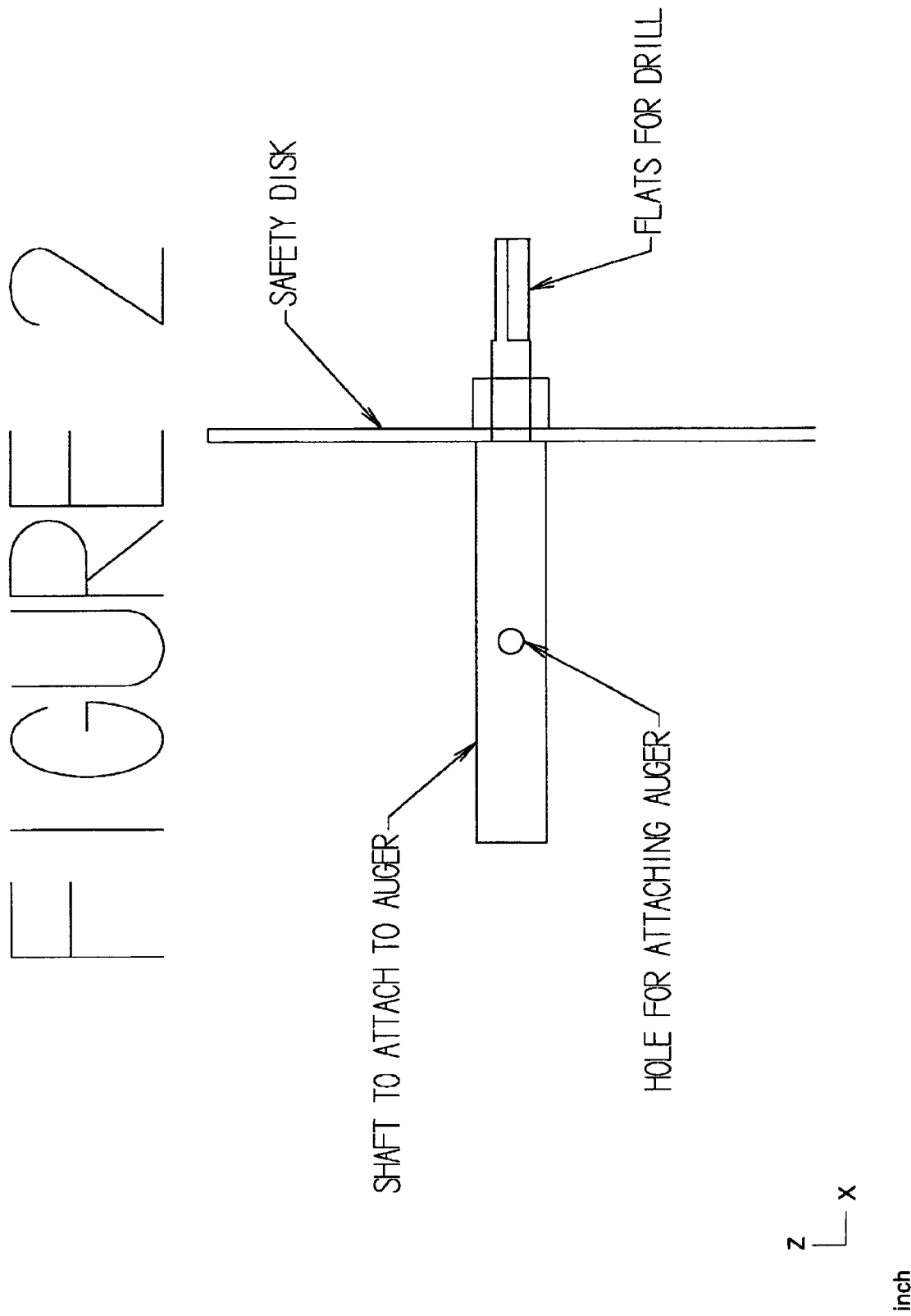

E-Z AUGER ADAPTOR

SUMMARY OF INVENTION

The shaft on the Easy Auger Adapter is connected directly to the chuck of a standard battery operated drill. The adaptor end of the unit connects directly to the auger. The Easy Auger Adapter creates effortless drilling of holes due to the ease and speed of the battery operated drill. The safety disk prevents the auger from slipping through the drilled hole.

BRIEF DESCRIPTION OF ASSEMBLY DRAWINGS

FIG. 1—Is an assembly view, which shows how the Easy Auger Adapter is attached to the drill and the auger.

FIG. 2—Is an assembly view of the Easy Auger Adapter.

DETAILED DESCRIPTION

The shaft on the Easy Auger Adapter is connected directly to the chuck of a standard battery operated drill. The adapter end of the unit connects directly to the auger. The Easy Auger Adapter creates effortless drilling of holes due to the ease and speed of the battery operated drill. The safety disk prevents the auger from slipping through the drilled hole.

What is claimed is:

1. An auger adapter comprising in combination, a milled shaft attached to a battery operated drill, an adapter shaft attached to an ice auger, and a safety disk located between the milled shaft and the adapter shaft.

* * * * *